United States Patent Office 2,986,579
Patented May 30, 1961

2,986,579

PREPARATION OF ALKYLPHOSPHORUS DICHLORIDE

Louis Schmerling, Riverside, Ill., assignor, by mesne assignments, to Universal Oil Products Company, Des Plaines, Ill., a corporation of Delaware No Drawing. Filed Mar. 26, 1954, Ser. No. 419,106

20 Claims. (Cl. 260—543)

*Preparation of intermediate organic compounds*

This invention relates to a process for producing intermediate organic compounds and particularly to a process for producing an alkylphosphorus dichloride. Such alkylphosphorus dichlorides are desirable intermediates in the production of biologically active compounds and particularly in the production of military toxicants.

An object of this invention is to produce an alkylphosphorus dichloride.

Another object of this invention is to produce methylphosphorus dichloride.

Alkylphosphorus dichlorides are intermediate compounds for use in the preparation of biologically active materials. In particular, methyl phosphorus dichloride is an important intermediate compound in such preparations. Several of the preferred methods for the production of methyl phosphorus dichloride lead directly to the formation of a complex between methyl phosphorus dichloride and aluminum chloride. For example, methyl chloride is absorbed by a mixture of phosphorus trichloride and aluminum chloride to give a ternary complex, the structure of which is not definitely known. This ternary complex may be reduced by metallic aluminum to give a complex between methyl phosphorus dichloride and aluminum chloride. This process may be represented by the chemical equations:

$$CH_3Cl + PCl_3 + (1+x)AlCl_3 = CH_3Cl \cdot PCl_3 \cdot (1+x)AlCl_3$$

$$3CH_3Cl \cdot PCl_3 \cdot (1+x)AlCl_3 + 2Al = 3CH_3PCl_2 \cdot (5+3x)AlCl_3$$

In these equations, $x$ is a positive fraction usually in the range 0.1 to 0.5, corresponding to the amount of excess aluminum chloride which is usually found desirable. Another method by which a complex between methyl phosphorus dichloride and aluminum chloride may be produced is reaction between phosphorus trichloride and methyl aluminum chlorides. These reactions take place in accordance with the following equations:

$$CH_3AlCl_2 + PCl_3 = CH_3PCl_2 \cdot AlCl_3$$

$$(CH_3)_2AlCl + 2PCl_3 = 2CH_3PCl_2 \cdot AlCl_3$$

It is ordinarily preferred to produce a mixture of methyl aluminum dichloride and dimethyl aluminum chloride by reaction of methyl chloride with metallic aluminum, and to react this mixture directly with phosphorus trichloride. It is apparent that these various processes produce complexes of methyl phosphorus dichloride and aluminum chloride containing varying ratios of the two components. While much experimental work has been done in an effort to develop a satisfactory process for recovering methyl phosphorus dichloride from these complexes, the only methods which have been developed involve complex operations and expensive chemicals. The process of my invention, on the other hand, permits methyl phosphorus dichloride to be recovered from these complexes by a simple and economical operation.

In one embodiment my invention relates to a process for producing an alkylphosphorus dichloride which comprises commingling a halide of an alkali metal with a complex of aluminum chloride and an alkylphosphorus dichloride, heating the mixture, and recovering the resultant free alkylphosphorus dichloride.

Another embodiment of my invention relates to a process for producing an alkylphosphorus dichloride which comprises commingling sodium chloride with a complex of aluminum chloride and an alkylphosphorus dichloride, heating the mixture, and recovering the resultant free alkylphosphorus dichloride.

A still further embodiment of my invention relates to a process for producing methylphosphorus dichloride which comprises commingling sodium chloride with a complex of aluminum chloride and methylphosphorus dichloride, heating the mixture, and recovering the resultant free methylphosphorus dichloride.

In accordance with the process of this invention, an alkylphosphorus dichloride complex with aluminum chloride is reacted directly with the halide of the alkali metal to produce the desired alkylphosphorus dichloride compound. While the number of carbon atoms in the alkyl group of the alkylphosphorus dichloride is not critical, it is usually most desirable to produce alkylphosphorus dichlorides which contain five or less carbon atoms. Alkylphosphorus dichlorides included within the scope of the present invention are methylphosphorus dichloride, ethylphosphorus dichloride, normal propylphosphorus dichloride, isopropylphosphorus dichloride, normal butylphosphorus dichloride, isobutylphosphorus dichloride, secondary butylphosphorus dichloride, tertiary butylphosphorus dichloride, amylphosphorus dichlorides, etc. These and other alkylphosphorus dichlorides can be separated from their complexes with aluminum chloride by utilization of the process of this invention.

As hereinabove set forth, the process of this invention comprises commingling the halide of an alkali metal with a complex of aluminum chloride with an alkylphosphorus dichloride. The particular halide of an alkali metal utilizable in the process of this invention is not critical. Suitable halides of an alkali metal include sodium chloride, potassium chloride, sodium bromide, potassium bromide, etc., or mixtures of the above. For economic reasons, sodium chloride is usually preferred. Furthermore, it is also convenient in some instances to use an excess of the halide of an alkali metal in solution in a molten complex of alkali metal halide aluminum halide.

This process is illustrated further by the following equations:

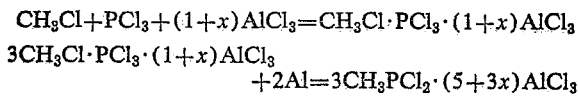

where R=alkyl; Me=alkali metal; X=halogen; and

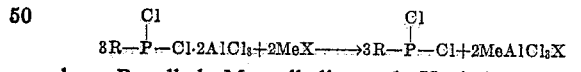

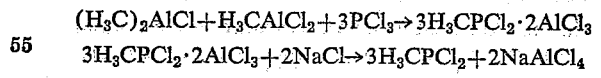

The first equation is illustrative of the broad scope of the present invention while the second and third equations are specific to the production of methylphosphorus dichloride utilizing sodium chloride as the complex breaking agent.

It will also be noted from the above equations that the minimum amount of alkali metal halide utilized is equivalent on a molar basis to the amount of aluminum chloride present in the complex of the alkylphosphorus dichloride with aluminum chloride. However, in many instances it is desirable to utilize a molar excess of the halide of the alkali metal. For example, in the preparation of methylphosphorus dichloride from its complex with aluminum chloride by reaction with sodium chloride, it is usually desirable to utilize more than a one to one molar ratio of sodium chloride to aluminum chloride. Sodium chloride forms a one to one complex with aluminum chloride which melts at 169° C. The eutectic mixture of sodium chloride and aluminum chloride melts at 124° C. This eutectic mixture contains 41% by weight of sodium chloride. Therefore, when utilizing sodium chloride to form the complexes with aluminum chloride, it is usually desirable to use from about a molar equivalent up to about 1.6 moles or more; a ratio of 1.6 moles of sodium chloride to 1 mole of aluminum chloride yielding the eutectic mixture. Similar illustrations can be given for each of the other halides of the alkali metal. They will each be used in such quantities as to be at least equivalent on a molar basis to the aluminum chloride initially present. Such greater quantities of these other halides of the alkali metals may also be used up to at least the point where the lowest melting aluminum chloride eutectic is formed.

In carrying out the process of the present invention, temperatures are used above those required for the decomposition of the alkylphosphorus dichloride-aluminum chloride complex and for the resulting formation of the aluminum chloride-alkali metal halide complex. For example, the aluminum chloride-sodium chloride complex is formed most readily at temperatures above about 65° C. Thus, while the sodium chloride may be commingled with the alkylphosphorus dichloride-aluminum chloride complex at room temperature, the mixture is heated to about 65° C. or higher to free the desired alkylphosphorus dichloride. Higher temperatures are utilized as required. The only temperature limitation is that temperatures are used below which thermal decomposition of the desired alkylphosphorus dichloride takes place. Pressure is not critical but the reaction is usually carried out at atmospheric pressure or lower. Pressures as low as 1 millimeter of mercury have been used successfully. In many cases, the temperature utilized will be correlated with the pressure so that the desired alkylphosphorus dichloride is obtained overhead as a pure product.

The process of this invention may be carried out as a batch or a continuous type process. In a batch process, the alkali metal halide is added to the complex of the alkylphosphorus dichloride and aluminum chloride, and the reaction mixture heated. In some cases, as set forth hereinabove, it is desirable to utilize a mixture of sodium chloride and aluminum chloride as the complex-breaking agent to be added. When this is desirable, a mixture is used in which there is an excess of alkali metal halide over that required to form a mole to mole mixture of for example, sodium chloride, and aluminum chloride. In a continuous type process, a reactor may be partially filled with a mixture of sodium chloride and aluminum chloride. Such a mixture melting at 123° C. and containing 41% by weight of sodium chloride is preferable. To this reactor is then added the mixture of the alkylphosphorus dichloride complex with aluminum chloride such as methylphosphorus dichloride complex with aluminum chloride. Also sodium chloride is added continuously in such quantities so that the low melting eutectic mixture in the bottom of the reactor remains of approximately constant composition. As the alkylphosphorus dichloride, such as methylphosphorus dichloride is formed, it is removed overhead from the reactor by means of sufficient temperature in the system or any desired partial vacuum. Then, as the level of the sodium chloride-aluminum chloride mixture builds up in the reactor, it is removed from the bottom of the reactor to maintain a constant level therein. The equipment utilized will be of materials of construction so that corrosion due to the presence of the various reactants is not a serious problem.

The product formed in the process of this invention, namely, the alkylphosphorus dichloride, after separation may be further purified by distillation, if necessary, or may be passed as intermediate to another process. If it is desired as a pure product, it may be removed from the process system as such at this point.

The above process will be further illustrated by the following examples of this process which should not be misconstrued to unduly limit the generally broad scope of this invention.

The experiments were carried out in a glass flask equipped with a side arm dropping funnel. The complex of methylphosphorus dichloride and aluminum chloride was added to heated sodium chloride or to a heated mixture of sodium chloride and sodium aluminum tetrachloride, or in some cases the methylphosphorus dichloride-aluminum chloride complex was mixed with the salt and then heated. The methylphosphorus dichloride was recovered as an overhead which was condensed in a trap maintained at −78° C. In each case, the pressure of the system ranged from about 5 to about 10 mm. of mercury.

*Example I*

Sodium aluminum tetrachloride was prepared by heating 30 grams of sodium chloride and 67 grams of aluminum chloride at 185–195° C. under 100 atmospheres of initial hydrogen pressure for four hours time. A mixture of 20 grams of the resultant amber crystalline cake and 2.0 grams of sodium chloride was heated to 185° C. in the test apparatus and 17.5 grams of the complex of methylphosphorus dichloride and aluminum chloride was added during three minutes time. There was much boiling and the desired product began to accumulate in the overhead trap. The flask was evacuated to 7 mm. pressure and kept at 185° C. for a two-hour time period. 5.5 grams of crystalline methylphosphorus dichloride was obtained in the overhead trap maintained at −78° C. This is equivalent to a 67% yield.

*Example II*

In order to show that the results obtained in Example I were not due to the dissociation of the complex between methylphosphorus dichloride and aluminum chloride at the high temperature, in another experiment the complex was heated in the absence of sodium chloride. The empty flask was evacuated to 7 mm. pressure and heated in an oil bath at 168° C., while the complex of methylphosphorus dichloride and aluminum chloride (10.6 g.) was added during four minutes time. The temperature of the oil bath was gradually raised to 201° C. The complex boiled but only 0.2 cc of product condensed in the overhead trap. An additional 8.8 g. of the complex was added. A total of 0.4 cc. of liquid condensed in the overhead trap although the liquid was boiling quite vigorously. It may be concluded that sodium chloride is a complex breaking agent for the methylphosphorus dichloride-aluminum chloride complex.

*Example III*

In Example I it was shown that a mixture of sodium chloride and sodium aluminum tetrachloride was effective as a complex breaking agent. That the presence of sodium aluminum tetrachloride, as such, is not necessary at the beginning of the reaction was shown in an experiment in which 16 grams of the methylphosphorus dichloride was added to 10 grams of sodium chloride at 6 mm. pressure in a bath at 195° C. 6.5 grams of the desired methylphosphorus dichloride was obtained overhead. This is an 86% theoretical yield. The residue in the flask was an amber crystalline solid.

*Example IV*

The temperature of decomposition of the complex of methylphosphorus dichloride and aluminum chloride in the presence of sodium chloride was investigated by heating 18.5 grams of the complex in 10 grams of sodium chloride slowly and under 7 mm. pressure. The temperature was raised from room temperature to 60° C. during 90 minutes. About 0.1 cc. of liquid was condensed in the overhead trap at −78° C. Reaction set in at about 65° C. and 0.3 cc. of crystalline material condensed in the trap. The material in the flask boiled and consisted of a mixture of viscous turbid liquid and sodium chloride. With the temperature at 65–66° for 20 minutes, there was obtained about 1.5 cc. overhead. The product in the flask at this point was a dry crystalline mass which began to melt when the temperature reached 72° C., at 76° C., it was a mixture of liquid and uncombined sodium chloride. At this point the overhead trap contained a total of 2.5 cc. of crystalline methylphosphorus dichloride. The temperature was raised slowly and when it reached 120° C., a total of about 4 cc. of methylphosphorus dichloride was obtained. When the temperature reached 140° C., there was obtained a total of 5 cc. of the crystalline methylphosphorus dichloride. No additional overhead was obtained on further heating at 200° C. for one hour's time. The yield was 7.0 grams or about 78% of that theoretically expected.

I claim as my invention:

1. A process for producing an alkylphosphorus dichloride which comprises commingling a halide of an alkali metal with a complex of aluminum chloride and an alkylphosphorus dichloride, said alkyl phosphorous dichloride having not more than 5 carbon atoms in the alkyl group, heating the mixture to a temperature sufficient to initiate reaction of said complex with said halide of an alkali metal but below the thermal decomposition temperature of said alkyl phosphorous dichloride, and recovering the resultant free alkylphosphorus dichloride.

2. A process for producing an alkylphosphorus dichloride which comprises commingling a halide of an alkali metal with a complex of aluminum chloride and an alkylphosphorus dichloride, said alkylphosphorus dichloride having not more than 5 carbon atoms in the alkyl group, heating the mixture to a temperature above about 65° C. but below the thermal decomposition temperature of the alkyl phosphorous dichloride, and recovering the resultant free alkylphosphorus dichloride.

3. A process for producing an alkylphosphorus dichloride which comprises commingling at least one mole of a halide of an alkali metal per mole of complex with a complex of aluminum chloride and an alkylphosphorus dichloride, said alkylphosphorus dichloride having not more than 5 carbon atoms in the alkyl group, heating the mixture to a temperature sufficient to initiate reaction of said complex with said halide of an alkali metal but below the thermal decomposition temperature of said alkyl phosphorous dichloride, and recovering the resultant free alkylphosphorus dichloride.

4. A process for producing an alkylphosphorus dichloride which comprises commingling at least one mole of a halide of an alkali metal per mole of complex with a complex of aluminum chloride and an alkylphosphorus dichloride, said alkylphosphorous dichloride having not more than 5 carbon atoms in the alkyl group, heating the mixture to a temperature above about 65° C. but below the thermal decomposition temperature of the alkyl phosphorous dichloride, and recovering the resultant free alkylphosphorus dichloride.

5. A process for producing an alkylphosphorus dichloride which comprises commingling sodium chloride with a complex of aluminum chloride and an alkylphosphorus dichloride, said alkylphosphorous dichloride having not more than 5 carbon atoms in the alkyl group, heating the mixture to a temperature sufficient to initiate reaction of said complex with said sodium chloride but below the thermal decomposition temperature of said alkyl phosphorous dichloride, and recovering the resultant free alkylphosphorous dichloride.

6. A process for producing an alkylphosphorous dichloride which comprises commingling sodium chloride with a complex of aluminum chloride and an alkylphosphorous dichloride, said alkylphosphorous dichloride having not more than 5 carbon atoms in the alkyl group, heating the mixture to a temperature above about 65° C. but below the thermal decomposition temperature of the alkylphosphorous dichloride, and recovering the resultant free alkylphosphorous dichloride.

7. A process for producing an alkylphosphorous dichloride which comprises commingling at least one mole of sodium chloride per mole of complex with a complex of aluminum chloride and an alkylphosphorous dichloride, said alkylphosphorous dichloride having not more than 5 carbon atoms in the alkyl group, heating the mixture to a temperature sufficient to initiate reaction of said complex with said sodium chloride but below the thermal decomposition temperature of said alkylphosphorous dichloride, and recovering the resultant free alkylphosphorous dichloride.

8. A process for producing an alkylphosphorous dichloride which comprises commingling at least one mole of sodium chloride per mole of complex with a complex of aluminum chloride and an alkylphosphorous dichloride, said alkylphosphorous dichloride having not more than 5 carbon atoms in the alkyl group, heating the mixture to a temperature above about 65° C. but below the thermal decomposition temperature of the alkylphosphorous dichloride, and recovering the resultant free alkylphosphorous dichloride.

9. A process for producing an alkylphosphorous dichloride which comprises commingling at least 1.0 to about 1.6 moles of sodium chloride per mole of complex with a complex of aluminum chloride and an alkylphosphorous dichloride, said alkylphosphorous dichloride having not more than 5 carbon atoms in the alkyl group, heating the mixture to a temperature sufficient to initiate reaction of said complex with said sodium chloride but below the thermal decomposition temperature of said alkylphosphorous dichloride, and recovering the resultant free alkylphosphorous dichloride.

10. A process for producing an alkylphosphorous dichloride which comprises commingling at least 1.0 to about 1.6 moles of sodium chloride per mole of complex with a complex of aluminum chloride and an alkylphosphorous dichloride, said alkylphosphorous dichloride having not more than 5 carbon atoms in the alkyl group, heating the mixture to a temperature above about 65° C. but below the thermal decomposition temperature of the alkylphosphorous dichloride, and recovering the resultant free alkylphosphorous dichloride.

11. A process for producing methylphosphorous dichloride which comprises commingling sodium chloride with a complex of aluminum chloride and methylphosphorous dichloride, heating the mixture to a temperature sufficient to initiate reaction of said complex with said sodium chloride but below the thermal decomposition temperature of said methyl phosphorous dichloride, and recovering the resultant free methylphosphorous dichloride.

12. A process for producing methylphosphorous dichloride which comprises commingling sodium chloride with a complex of aluminum chloride and methylphosphorous dichloride, heating the mixture to a temperature above about 65° C. but below the thermal decomposition temperature of the methylphosphorous dichloride, and recovering the resultant free methylphosphorous dichloride.

13. A process for producing methylphosphorous dichloride which comprises commingling at least one mole of sodium chloride per mole of complex with a complex of aluminum chloride and methylphosphorous dichloride, heating the mixture to a temperature sufficient to initiate reaction of said complex with said sodium chloride but below the thermal decomposition temperature of said methylphosphorous dichloride, and recovering the resultant free methylphosphorous dichloride.

14. A process for producing methylphosphorous dichloride which comprises commingling at least one mole of sodium chloride per mole of complex with a complex of aluminum chloride and methylphosphorous dichloride, heating the mixture to a temperature above about 65° C. but below the thermal decomposition temperature of the methylphosphorous dichloride, and recovering the resultant free methylphosphorous dichloride.

15. A process for producing methylphosphorous dichloride which comprises commingling at least 1.0 to about 1.6 moles of sodium chloride per mole of complex with a complex of aluminum chloride and methylphosphorous dichloride, heating the mixture to a temperature sufficient to initiate reaction of said complex with said sodium chloride but below the thermal decomposition temperature of said methylphosphorous dichloride, and recovering the resultant free methylphosphorous dichloride.

16. A process for producing methylphosphorous dichloride which comprises commingling at least 1.0 to about 1.6 moles of sodium chloride per mole of complex with a complex of aluminum chloride and methylphosphorous dichloride, heating the mixture to a temperature above about 65° C. but below the thermal decomposition temperature of the methylphosphorous dichloride, and recovering the resultant free methylphosphorous dichloride.

17. A process for producing methylphosphorous dichloride which comprises commingling sodium chloride in the form of a mixture with sodium aluminum tetrachloride with a complex of aluminum chloride and methylphosphorous dichloride, heating the total mixture to a temperature sufficient to initiate reaction of said complex with said sodium chloride but below the thermal decomposition temperature of said methyl phosphorous dichloride, and recovering the resultant free methylphosphorous dichloride.

18. A process for producing methylphosphorous dichloride which comprises commingling sodium chloride in the form of a mixture with sodium aluminum tetrachloride with a complex of aluminum chloride and methylphosphorous dichloride, heating the total mixture to above about 65° C. but below the thermal decomposition temperature of the methylphosphorous dichloride, and recovering the resultant free methylphosphorous dichloride.

19. A process for producing methylphosphorous dichloride which comprises commingling at least one mole of sodium chloride in the form of a mixture with sodium aluminum tetrachloride per mole of complex with a complex of aluminum chloride and methylphosphorous dichloride, heating the total mixture to a temperature sufficient to initiate reaction of said complex with said sodium chloride but below the thermal decomposition temperature of said methyl phosphorous dichloride, and recovering the resultant free methylphosphorous dichloride.

20. A process for producing methylphosphorous dichloride which comprises commingling at least one mole of sodium chloride in the form of a mixture with sodium aluminum tetrachloride per mole of complex with a complex of aluminum chloride and methylphosphorous dichloride, heating the total mixture to a temperature above about 65° C. but below the thermal decomposition temperature of the methylphosphorous dichloride, and recovering the resultant free methylphosphorous dichloride.

References Cited in the file of this patent

Kinnear et al: Journal of the Chemical Society, 1952, pages 3437–45. Copy in Scientific Library.